US011867455B2

(12) United States Patent
Li et al.

(10) Patent No.: US 11,867,455 B2
(45) Date of Patent: Jan. 9, 2024

(54) REFRIGERATOR DRAWER AND REFRIGERATOR

(71) Applicants: QINGDAO HAIER REFRIGERATOR CO., LTD., Qingdao (CN); HAIER SMART HOME CO., LTD., Qingdao (CN)

(72) Inventors: Jiaming Li, Qingdao (CN); Hao Zhang, Qingdao (CN); Enpin Xia, Qingdao (CN); Kang Li, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 116 days.

(21) Appl. No.: 17/622,858

(22) PCT Filed: Oct. 15, 2019

(86) PCT No.: PCT/CN2019/111185
§ 371 (c)(1),
(2) Date: Dec. 26, 2021

(87) PCT Pub. No.: WO2020/258594
PCT Pub. Date: Dec. 30, 2020

(65) Prior Publication Data

US 2022/0243977 A1 Aug. 4, 2022

(30) Foreign Application Priority Data

Jun. 27, 2019 (CN) ......................... 201910566722.6

(51) Int. Cl.
*F25D 25/04* (2006.01)
*F25D 25/02* (2006.01)
(Continued)

(52) U.S. Cl.
CPC .......... *F25D 25/025* (2013.01); *E05F 1/1091* (2013.01); *E05Y 2900/31* (2013.01); *F25D 23/025* (2013.01); *F25D 25/04* (2013.01)

(58) Field of Classification Search
CPC ...... F25D 25/025; F25D 23/025; F25D 25/04; E05Y 2900/31; E05F 1/1091
See application file for complete search history.

(56) References Cited

U.S. PATENT DOCUMENTS

2006/0049731 A1 3/2006 Choi et al.
2011/0016908 A1 1/2011 Kim
(Continued)

FOREIGN PATENT DOCUMENTS

CN 1530616 A 9/2004
CN 2893571 Y 4/2007
(Continued)

*Primary Examiner* — Kimberley S Wright
(74) *Attorney, Agent, or Firm* — Cheng-Ju Chiang

(57) ABSTRACT

A refrigerator drawer comprises: a bracket, a first storage box disposed movably relative to the bracket a second storage box; a first door body fixedly connected to the first storage box; a second door body fixedly connected to the second storage box, both the first door body and the second door body being disposed on the same side of the first storage box, and the first door body and the second door body being engaged to open the second storage box; a lifting mechanism disposed between the first storage box and the bracket or between the first door body and the bracket, an assisting mechanism being disposed between the lifting mechanism and the bracket, the first door body driving the first storage box to move relative to the bracket, the assisting mechanism driving the lifting mechanism to bring the first storage box to rise up relative to the bracket.

10 Claims, 9 Drawing Sheets

(51) Int. Cl.

| | |
|---|---|
| *E05F 1/10* | (2006.01) |
| *F25D 23/02* | (2006.01) |

(56) References Cited

U.S. PATENT DOCUMENTS

| | | | | |
|---|---|---|---|---|
| 2016/0187054 | A1 | 6/2016 | Park et al. | |
| 2019/0162466 | A1 * | 5/2019 | Yang | F25D 25/025 |

FOREIGN PATENT DOCUMENTS

| | | | | |
|---|---|---|---|---|
| CN | 101579180 | A | | 11/2009 |
| CN | 102405388 | A | | 4/2012 |
| CN | 202842919 | U | | 4/2013 |
| CN | 103826501 | A | | 5/2014 |
| CN | 104541116 | A | | 4/2015 |
| CN | 205593250 | U | | 9/2016 |
| CN | 106163330 | A | | 11/2016 |
| CN | 106705556 | A | * | 5/2017 |
| CN | 107763953 | A | * | 3/2018 |
| CN | 107763953 | A | | 3/2018 |
| EP | 2745736 | A1 | | 6/2014 |
| EP | 2990745 | A1 | | 3/2016 |
| JP | 2004323043 | A | * | 11/2004 |
| JP | 2016-131673 | A | | 7/2016 |

* cited by examiner

REFRIGERATOR DRAWER AND REFRIGERATOR

CROSS REFERENCE TO RELATED APPLICATIONS

The present invention is a 35 U.S.C. § 371 National Phase conversion of International (PCT) Patent Application No. PCT/CN2019/111185, filed on Oct. 15, 2019, which claims benefit of Chinese Application No. 201910566722.6, filed on Jun. 27, 2019, the disclosure of which is incorporated by reference herein. The PCT International Patent Application was filed and published in Chinese.

TECHNICAL FIELD

The present invention relates to the technical field of household appliance, and particularly to a refrigerator drawer and a refrigerator.

BACKGROUND

In the prior art, there is a type of refrigerators which employ a large freezing drawer as a freezing compartment. The freezing drawer is advantageous in providing convenient access to articles so that a user only needs to draw out the drawer to take out an article from the drawer. However, the freezing drawer still have the following drawbacks:

1. The drawer is drawn difficultly with a conventional guide rail transferring a drawing force, which is particularly more significant with a large-sized refrigerator.
2. The freezing drawer is positioned lower so that the user has to bend or squat upon opening the drawer and has an undesirable experience.
3. The freezing drawer does not have a partitioned design with a frequently-used zone so that food materials stored for a long time period are drawn out repeatedly and the freezing effect is affected.

SUMMARY

An object of the present invention is to provide a refrigerator drawer that may be lifted while being drawn out.

Another object of the present invention is to provide a refrigerator drawer which may be partitioned into zones for freezing.

To achieve one of the above objects, an embodiment of the present invention provides a refrigerator drawer, comprising:

a bracket, a first storage box disposed movably relative to the bracket;

a first door body fixedly connected to one side of the first storage box to open the first storage box;

a lifting mechanism disposed between the first storage box and the bracket or between the first door body and the bracket, an assisting mechanism being disposed between the lifting mechanism and the bracket, the first door body driving the first storage box to move relative to the bracket, the assisting mechanism driving the lifting mechanism to bring the first storage box to rise up relative to the bracket.

As a further improvement of the present invention, the lifting mechanism comprises a first link and a second link, both ends of the first link are pivotally connected to the first door body and the bracket, respectively, both ends of the second link are pivotally connected to the first door body and the bracket, respectively, the second link is configured as a bent link, and a driving point of the assisting mechanism is located between one of the both ends of the second link and a bent portion of the second link.

As a further improvement of the present invention, the assisting mechanism is configured as an air spring, the bracket comprises a horizontal bracket and a vertical bracket, the vertical bracket is fixed on the horizontal bracket, one end of the air spring is pivotally connected to a bottom of the vertical bracket, and the other end of the air spring is pivotally connected to the second link.

As a further improvement of the present invention, the second link is provided with at least two mounting holes, and the other end of the air spring is optionally pivotally connected to one of the at least two mounting holes.

As a further improvement of the present invention, the first link and the second link are respectively disposed on both sides of the first storage box, a synchronization rod is connected between the second links on both sides, and the synchronization rod is located at the bottom of the first storage box.

As a further improvement of the present invention, the refrigerator drawer further comprises a second storage box and a second door body fixedly connected to the second storage box, the bracket is fixedly connected to the second door body, the second storage box is arranged independent from and side by side with the first storage box; both the first door body and the second door body being disposed on the same side of the first storage box, and the first door body and the second door body being engaged to open the second storage box;

As a further improvement of the present invention, the refrigerator drawer further comprises a locking assembly disposed between the first door body and the second door body, the locking assembly comprises a switch member disposed on the first door body and a locking member controlled by the switch member, the switch member operably drives the locking member to move to engage the first door body with the second door body or disengage the first door body from the second door body.

As a further improvement of the present invention, the first door body has a first edge lower than the second door body, a recess is formed on a side of the first edge facing the second door body, the recess extends in a longitudinal direction of the first edge to form an operation space for operating the first door body, the switch member is disposed in the recess, the locking assembly further comprises an elastic element, the switch element is operable to drive the locking member to move to disengage the first door body from the second door body, and the elastic element presses the locking member to engage the first door body with the second door body.

As a further improvement of the present invention, the switch member is pivotally connected to the middle of the first edge, a pivot axis of the switch member is parallel to the longitudinal direction of the first edge, the locking member has a slope portion cooperating with the switch member, the switch member comprises a cooperation surface, and the switch member pivots to make the cooperation surface press the slope portion to drive the locking member to move against an elastic force.

As a further improvement of the present invention, the second storage box comprise a second chamber and a covering portion extending horizontally from an upper edge of the second chamber, the first storage box is located below the covering portion and an opening of the first storage box is at least partially covered by the covering portion, an edge of the covering portion extends upward to form an air hole portion, the air hole portion is provided with a plurality of air holes, the first storage box comprises a first chamber, and the first chamber and the second chamber are in air communication through the plurality of air holes.

As a further improvement of the present invention, the second door body is configured as a frame body comprising a door body hollow portion, the first door body covers the door body hollow portion, a seal is disposed between the first door body and the second door body, the seal is disposed around the door body hollow portion, and a portion of the first storage box extends into the door body hollow portion.

To achieve another one of the above objects, an embodiment of the present invention provides a refrigerator drawer, comprising:

a first storage box;

a second storage box arranged independent from and side by side with the first storage box;

a first door body fixedly connected to one side of the first storage box to open the first storage box;

a second door body fixedly connected to the second storage box, both the first door body and the second door body being disposed on the same side of the first storage box, and the first door body and the second door body being engaged to open the second storage box;

a locking assembly disposed between the first door body and the second door body, the locking assembly comprises a switch member disposed on the first door body and a locking member controlled by the switch member, the switch member operably drives the locking member to move to engage the first door body with the second door body or disengage the first door body from the second door body.

As a further improvement of the present invention, a lifting mechanism disposed between the first storage box and the second storage box, an assisting mechanism being disposed between the lifting mechanism and the second storage box, the first door body moved relative to the second storage box, the assisting mechanism driving the lifting mechanism to bring the first storage box to rise up relative to the second storage box.

Another embodiment of the present invention provides a refrigerator, comprising: a cabinet and the refrigerator drawer disposed on the cabinet as stated in the above embodiments, wherein the refrigerator drawer is disposed at a bottom of the cabinet.

As compared with the prior art, the refrigerator according to embodiments of the present invention are provided with the lifting mechanism and the assisting mechanism, the drawer may be lifted upwards after being drawn out, the number of times that the user bends/squats is reduced, and the user's experience is improved. In addition, the refrigerator is provided with two storage boxes arranged side by side in the front-rear direction, that is, a partitioned design in the front-rear direction is achieved in the freezing drawer zone, so the appearance is novel. Furthermore, the front zone may store food materials with a short storage duration, and the rear zone may store food materials with a long storage duration. Therefore, it is unnecessary to open the storage box in the rear when the drawer is opened each time. As such, storing the food materials with the long storage duration inside provides a small temperature change to ensure a freezing effect, does not change the user's traditional refrigerator-using habit and provides convenience and utility.

DETAILED DESCRIPTION

Figure 1:
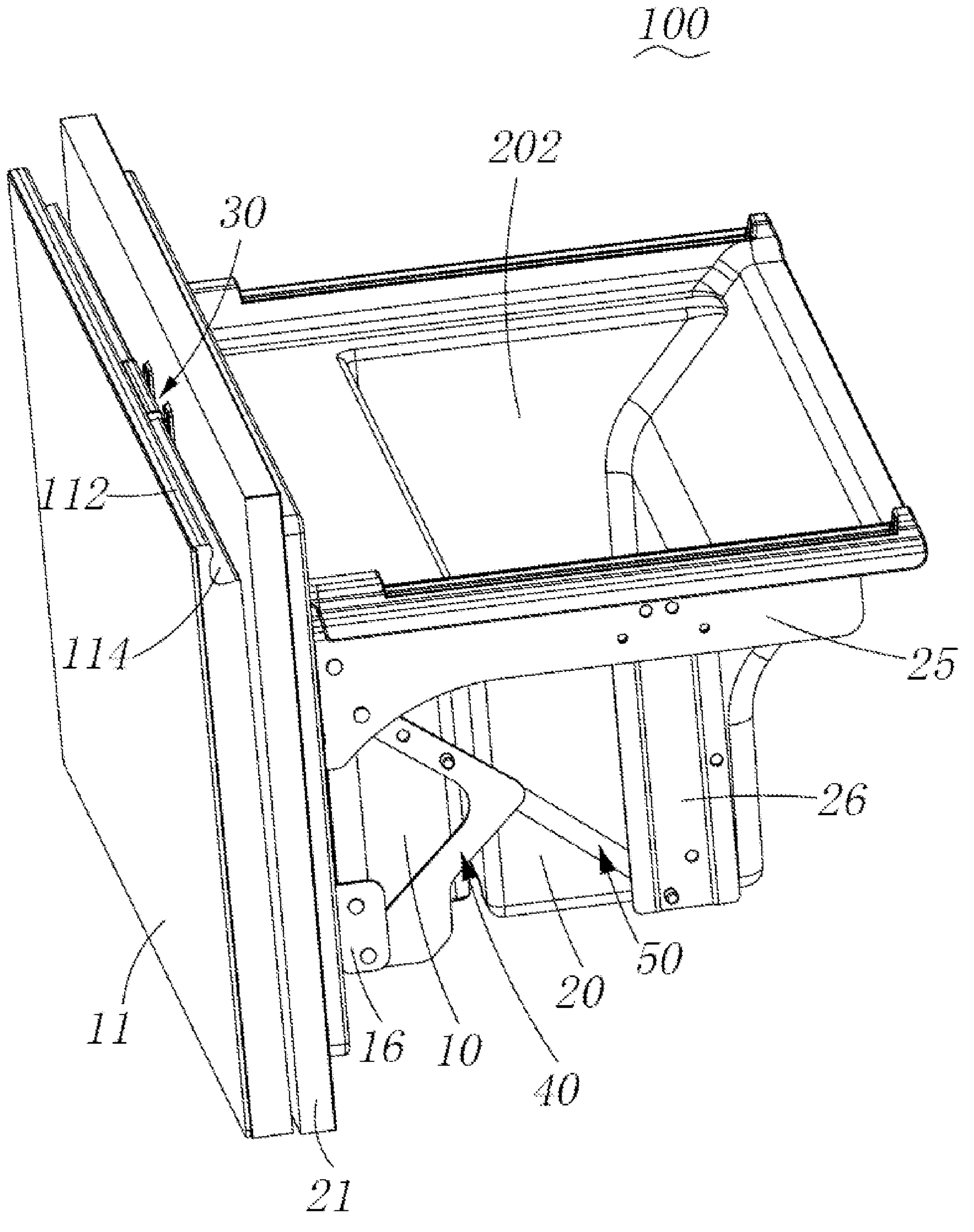
FIG. 1 is a perspective view of a refrigerator drawer according to an embodiment of the present invention.
Figure 2:
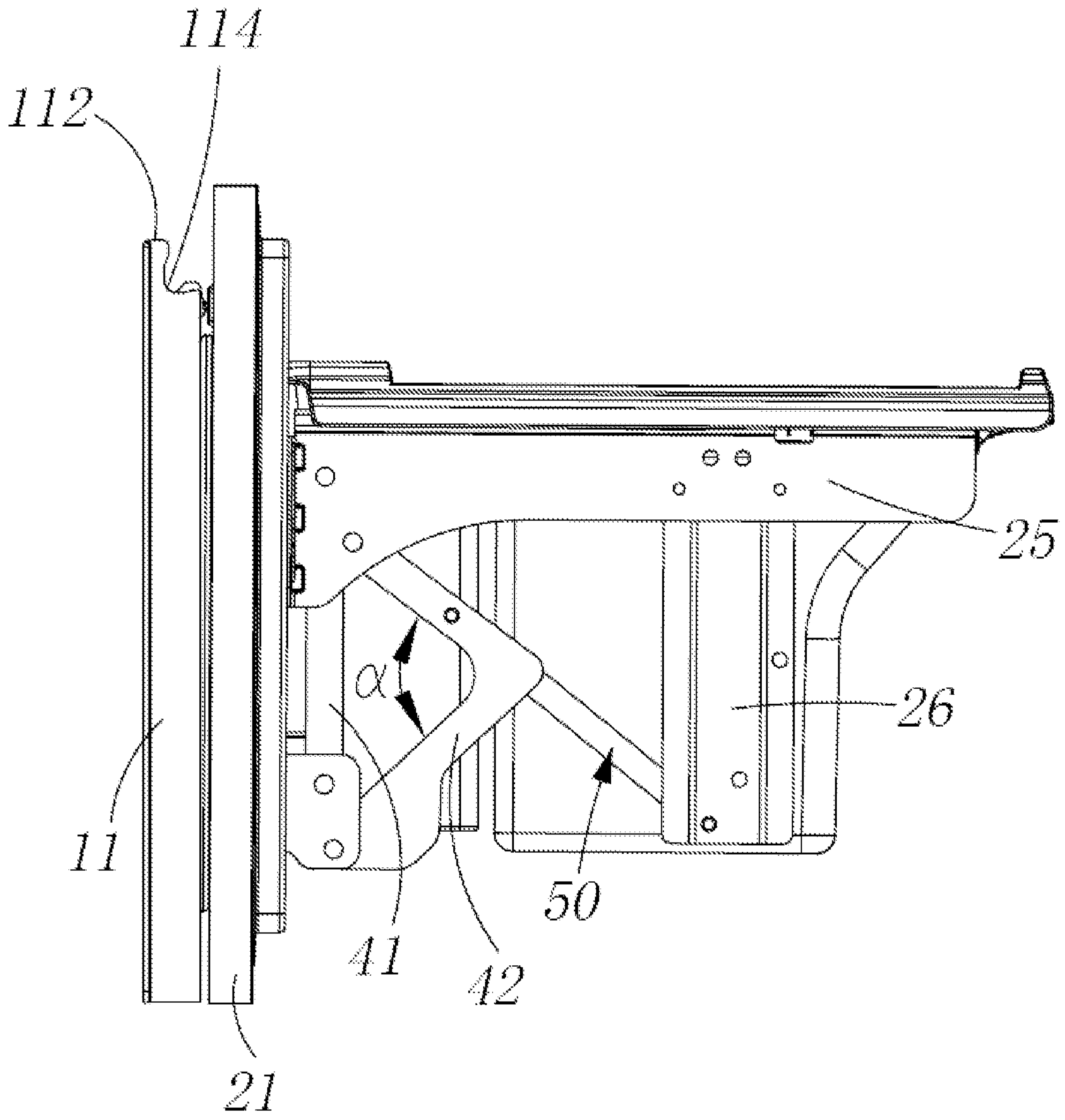
FIG. 2 is a front view of the drawer of FIG. 1.
Figure 3:
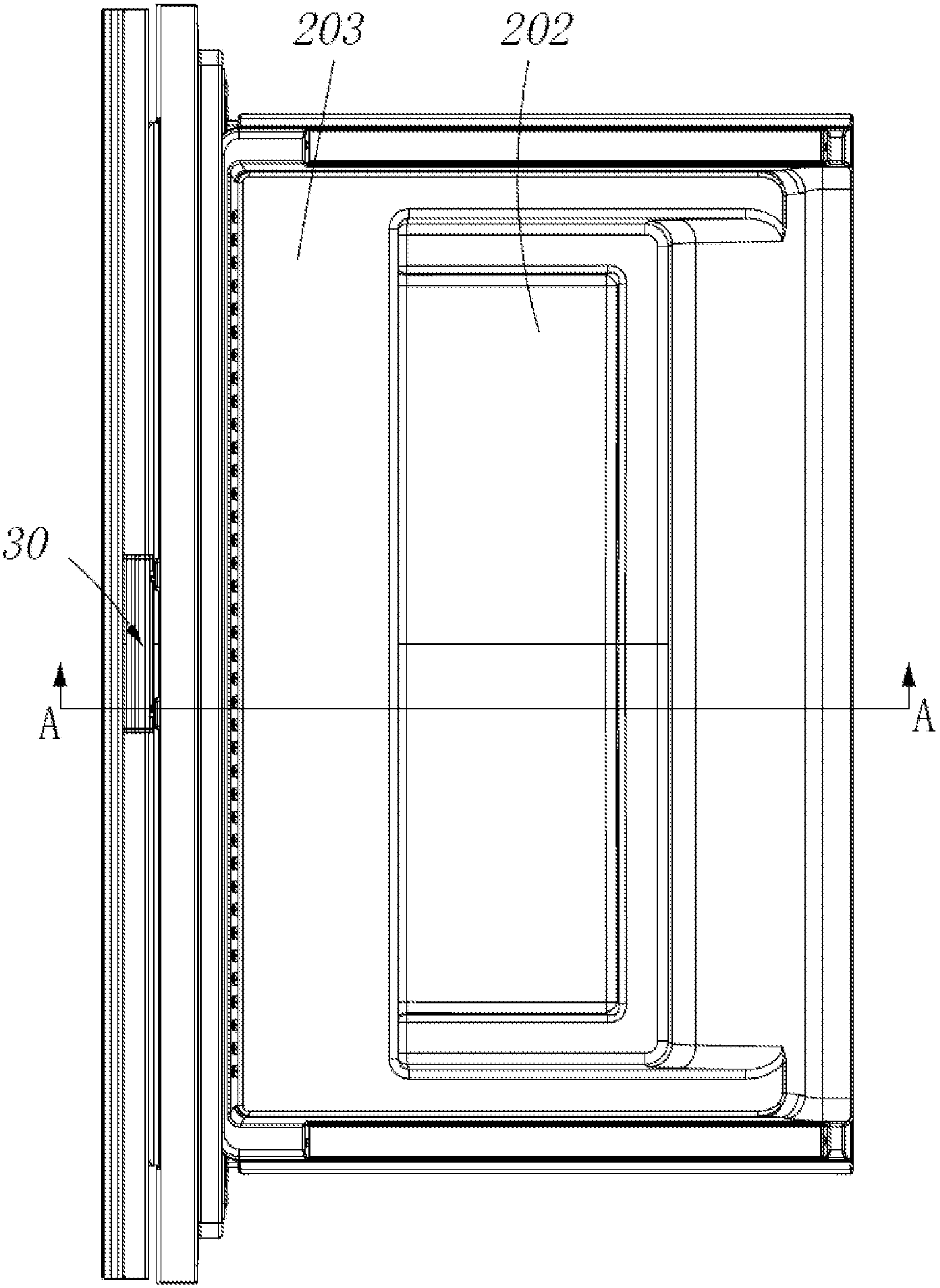
FIG. 3 is a top view of the drawer of FIG. 1.
Figure 4:
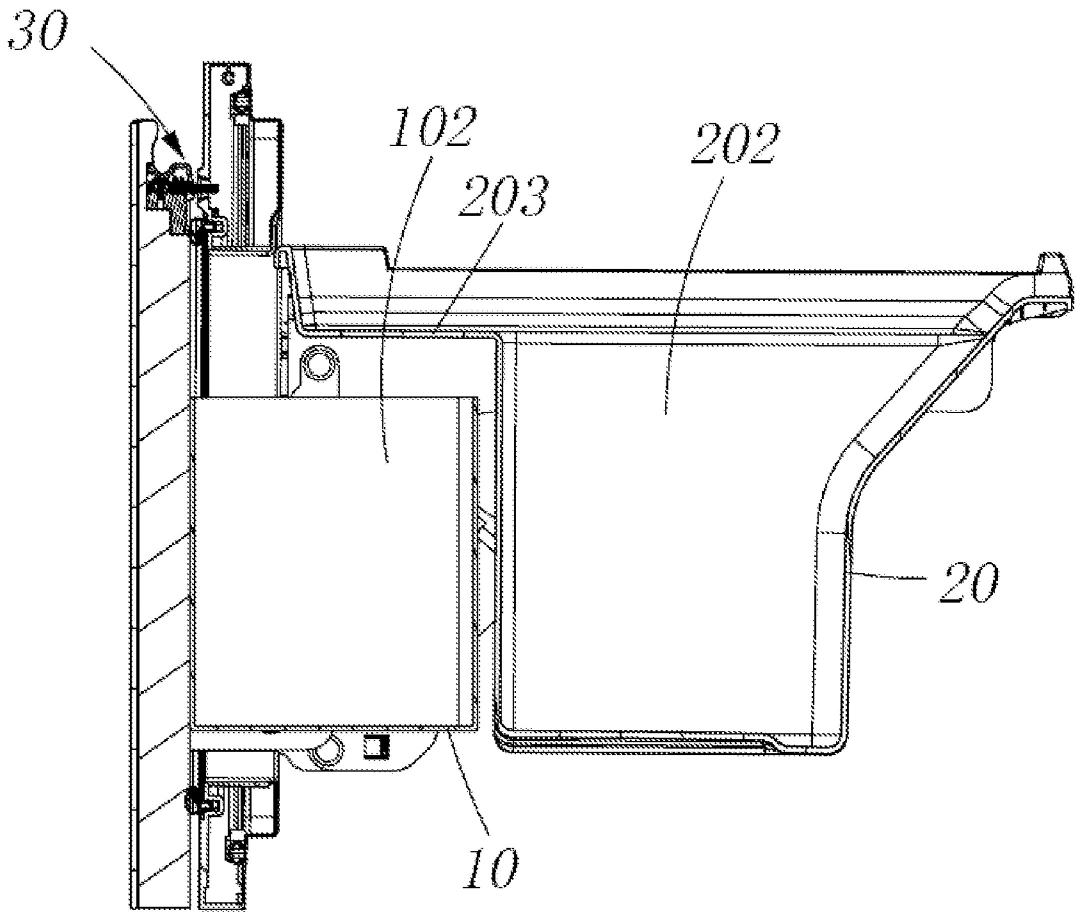
FIG. 4 is a cross-sectional view taken along line A-A of FIG. 3.
Figure 5:
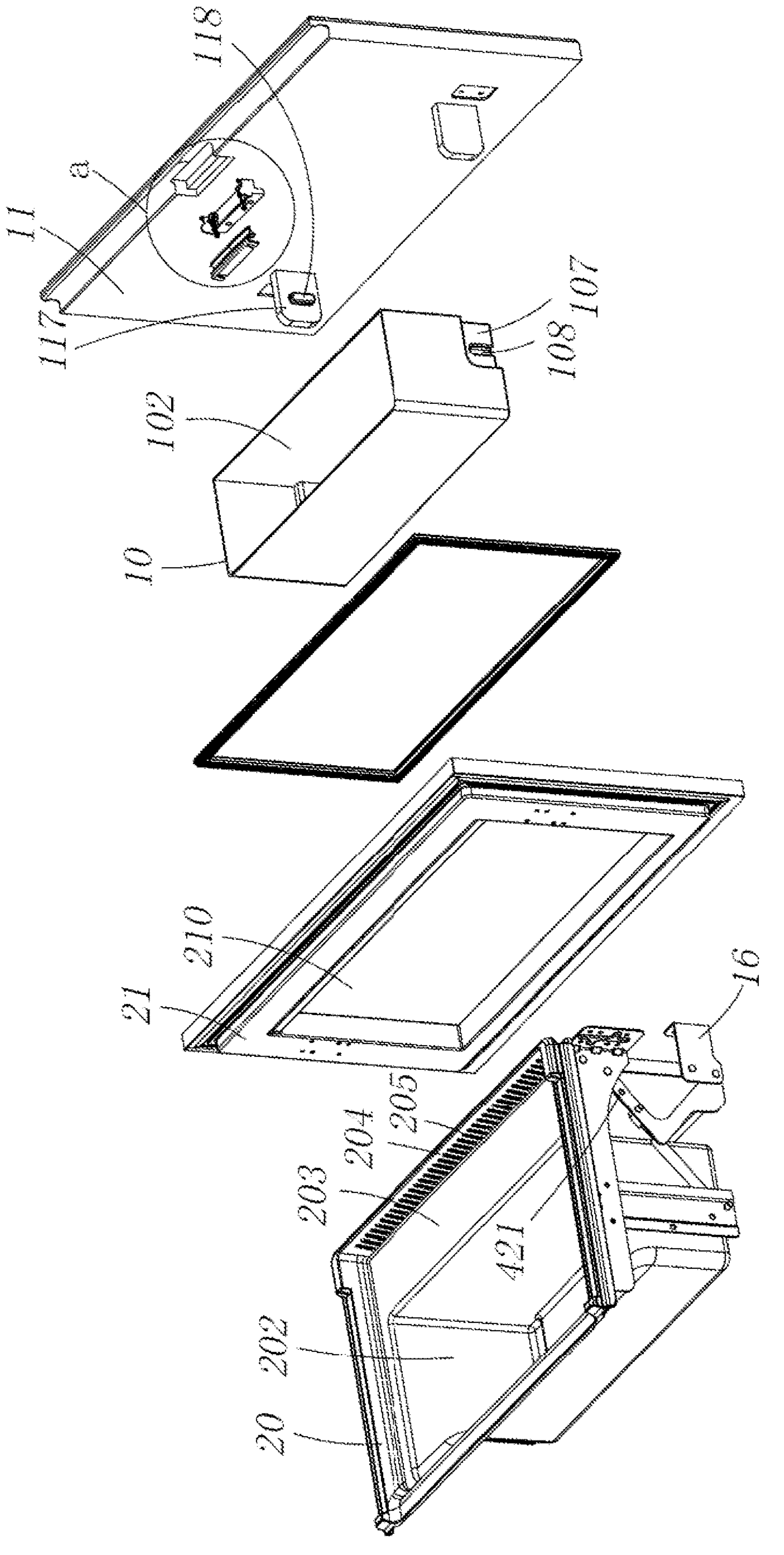
FIG. 5 is an exploded perspective view of the drawer of FIG. 1.
Figure 6:
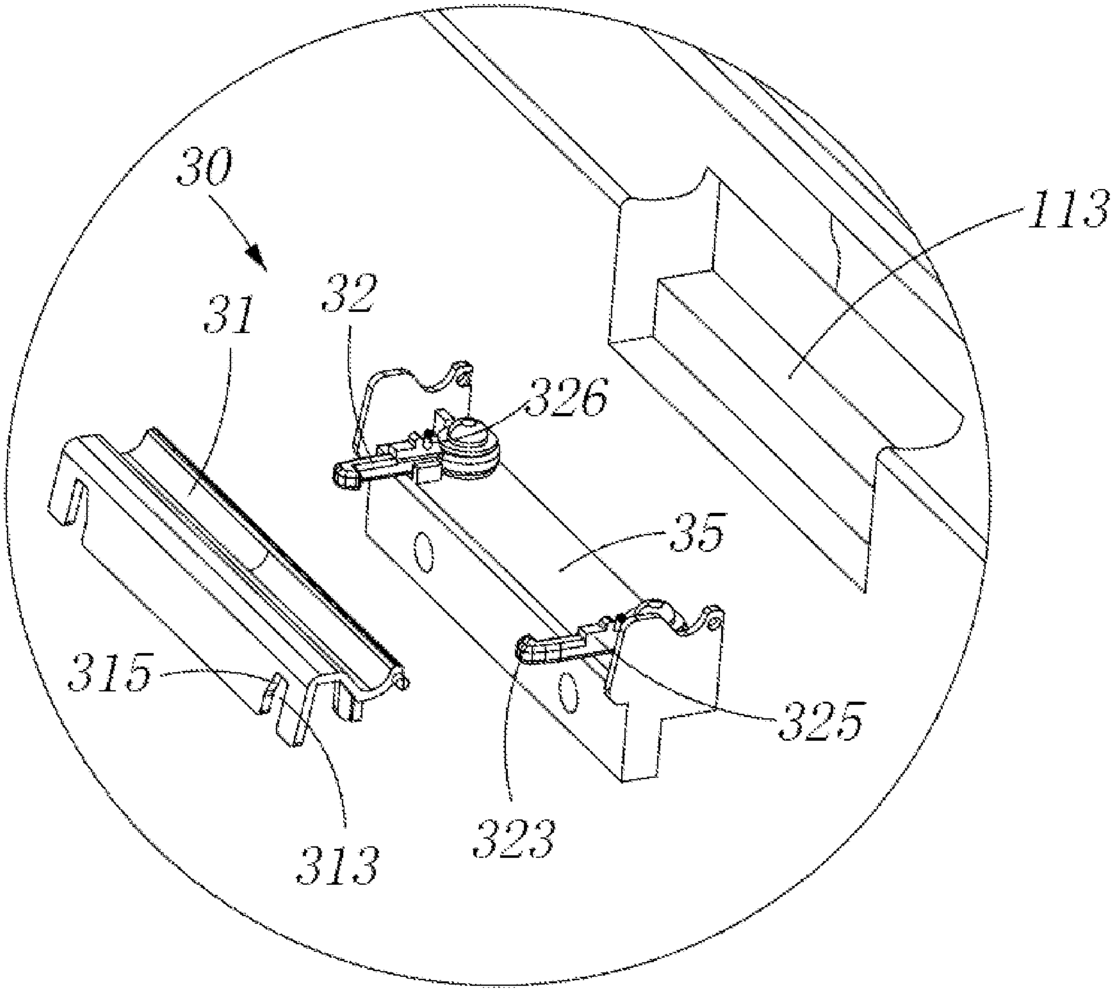
FIG. 6 is an enlarged view of portion a of FIG. 5.
Figure 7:
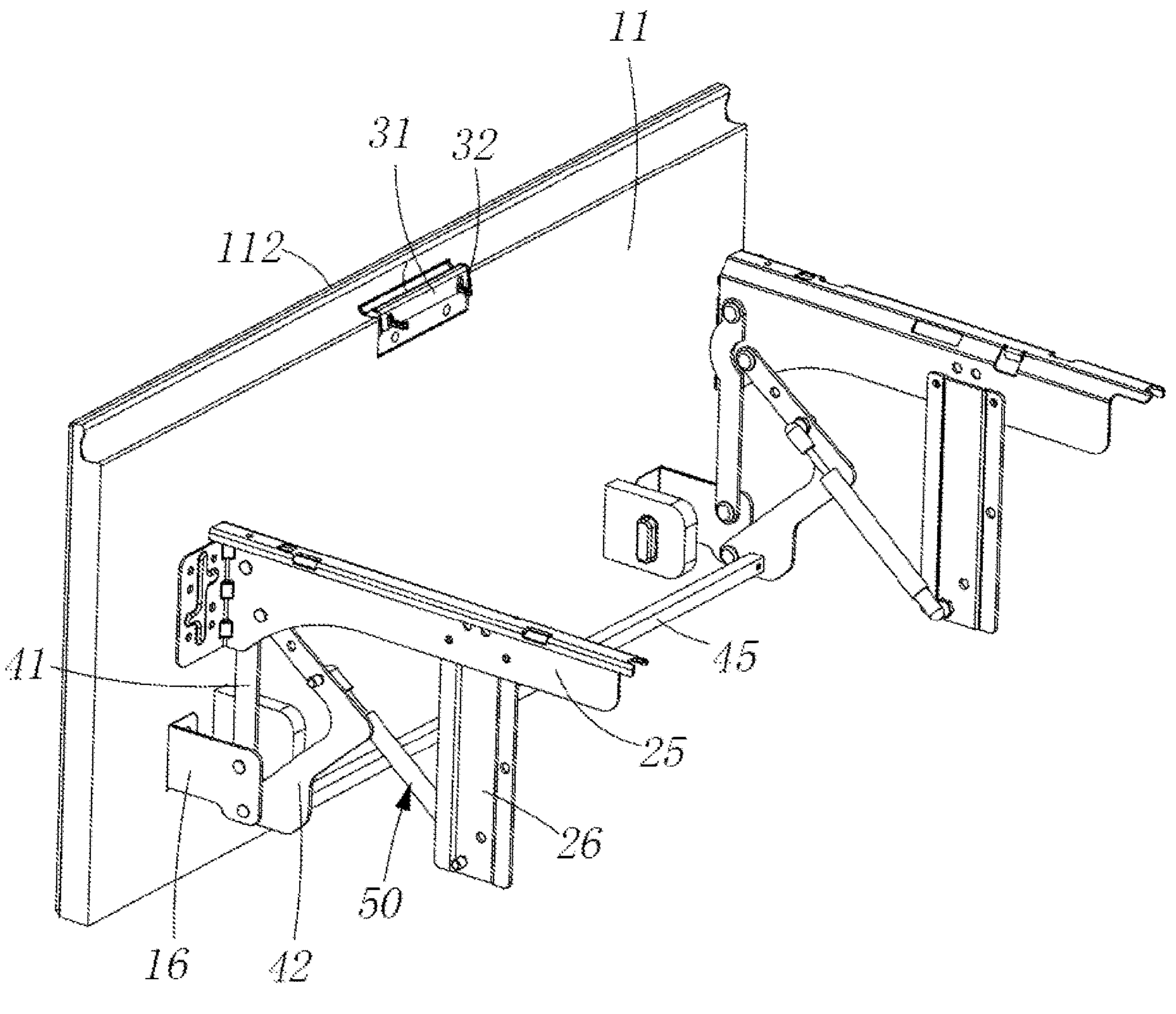
FIG. 7 is a perspective view of partial components of the refrigerator drawer of FIG. 1.
Figure 8:
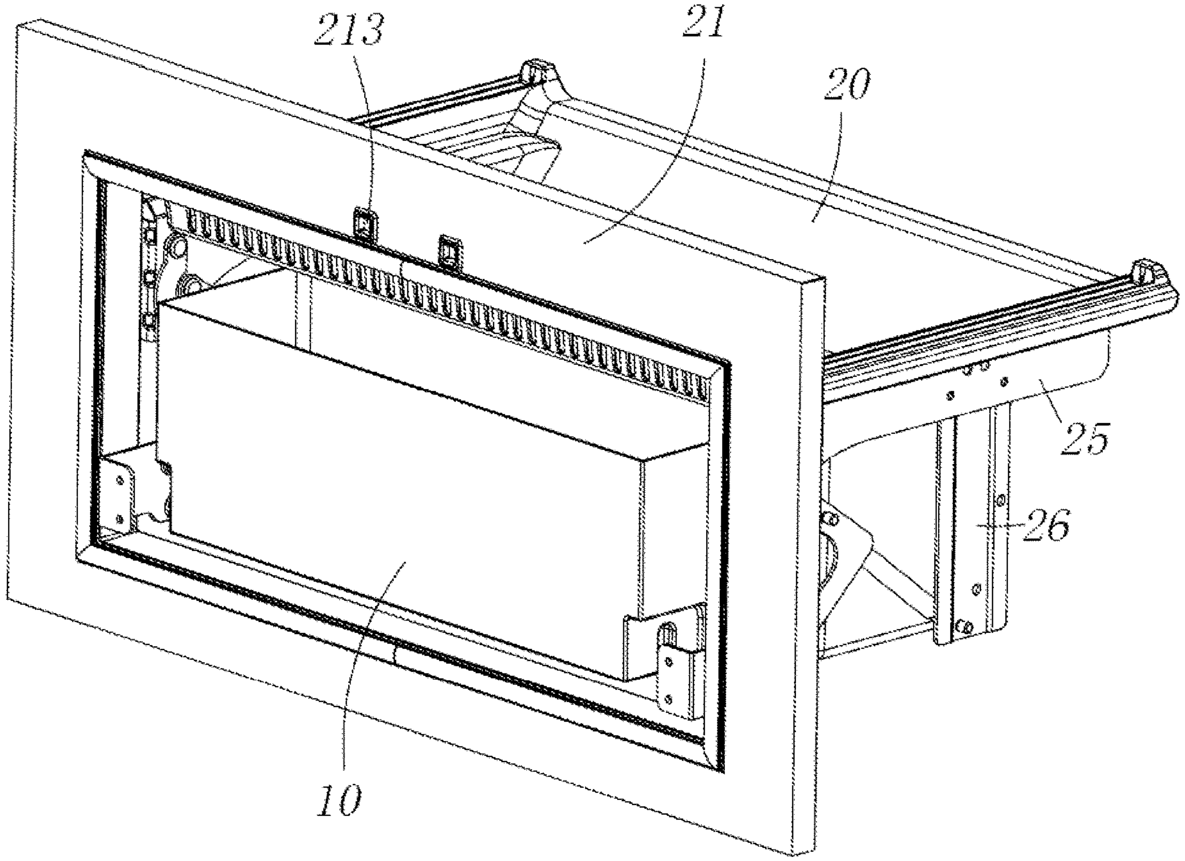
FIG. 8 is a perspective view of the refrigerator drawer of FIG. 1 with a first door body being removed.

The present invention will be described in detail in conjunction with embodiments shown in the figures. However, the embodiments are not intended to limit the present invention. Structural, methodological or function variations made by those having ordinary skill in the art according to the embodiments are all included in the protection scope of the present invention.

It should be appreciated that terms indicating spatial relative positions such as "up", "down", "in" and "out" used in the text herein are intended to describe a relationship of one unit or feature shown in figures relative to another unit or feature for an easy description purpose. The terms indicating spatial relative positions may be intended to include different orientations besides the orientations shown in the figures in use or operation of the device.

Referring to FIG. 1 through FIG. 6, an embodiment of the present invention provides a refrigerator drawer 100, comprising a first storage box 10 and a second storage box 20 which are arranged independent from each other and side by side, that is, the refrigerator drawer comprises two drawers arranged side by side in a front-rear direction. The front-rear direction here means that a direction in which the user draws out the refrigerator drawer when facing the refrigerator is front, and an opposite direction is rear; a height direction of the refrigerator refers to an up-down direction; a left-right direction is perpendicular to the front-rear direction and the up-down direction. A first door body 11 is fixedly connected to a front side of the first storage box 10, and the first door body 11 is operated to open the first storage box 10; a second door body 21 is fixedly connected to the second storage box 20, the first door body 11 and the second door body 21 are both disposed on the front side of the first storage box 10, and the first door body 11 and the second door body 21 are engaged to open the second storage box 20. The "engaged" here may be understood in a way that the first door body 11 and the second door body 21 are operated to move together. An operation manner may be operating the first door body 11 and/or the second door body 21 or operating other components.

The two storage boxes are arranged side by side in the front-rear direction, that is, a partitioned design in the front-rear direction is achieved in the freezing drawer zone, so the appearance is novel. Furthermore, the front zone may store food materials with a short storage duration, and the rear zone may store food materials with a long storage duration. When the food materials are taken from the front zone, the user only needs to operate the first door body 11 to open the first storage box 10, thereby reducing the mass load upon drawing the drawer and improving the user's experience. Certainly, the inside storage box storing the food materials with a long storage duration may still be drawn out as a whole in a conventional manner, i.e., the first door body 11 and the second door body 12 are engaged together and operated to open the second storage box 20. Therefore, it is unnecessary to open the second storage box 20 when the drawer is opened each time. As such, storing the food materials with the long storage duration inside provides a small temperature change to ensure a freezing effect, does not change the user's traditional refrigerator-using habit and provides convenience and utility.

Furthermore, to facilitate the user's operation, the refrigerator drawer 100 further comprises a locking assembly 30 disposed between the first door body 11 and the second door body 21. The locking assembly 30 comprises a switch member 31 disposed on the first door body 11 and a locking member 32 controlled by the switch member 31. The switch member 31 operably drives the locking member 32 to move to engage the first door body 11 with the second door body 21 or disengage the first door body 11 from the second door body 21. That is to say, with the specific configuration of the locking assembly 30 being set, it is possible to operate the switch member 31 and draw the first door body 11 outward to open the first storage box 10; it is possible to only pull other positions of the first door body 11 without operating the switch member 31, to open the second storage box 20 since the first door body 11 and the second door body 21 are locked and engaged together. It is also possible to operate the switch member 31 to lock and engage the first door body 11 with the second door body 21, thereby opening the second storage box 20; it is possible to draw out the first door body 11 by only pulling other positions of the first door body 11, to open the first storage box 10 without operating the switch member 31, since the first door body 11 and the second door body 21 are not locked and may be disengaged.

In the present embodiment, it is preferable to employ the manner of operating the switch member 31 to draw the first door body 11 outward to open the first storage box 10. Since opening only the first storage box 10 requires a small force and can be achieved by operating the switch member 31 with one hand, the switch member 31 may be disposed compactly; however, since opening the second storage box 20 also needs to bring the first storage box 10 out, a large fore is needed, and both hands may operate. A larger operation space may be reserved on the first door body 1 to facilitate the user to operate with both hands. Since the first door body 11 may be opened separately, a zone opened by the first door body 11 is smaller than a zone formed by an outer contour of the second door body 21.

Specifically, the first door body 11 has a first edge 112 lower than the second door body 21, the first edge 112 may be an upper edge of the first door body 11, and a recess 114 is formed on a side of the first edge 112 facing the second door body 21. The recess here refers to a recess formed relative to the upper side of the first door body 11 and the inner side of the first door body 11. The recess 114 extends in a longitudinal direction of the first edge 112 to form an operation space between the first door body 11 and the second door body 21. The user's fingers may extend into the operation space to operate the first door body 11, that is to say, the first edge 112 is formed with a handle for operating the first door body 11. The switch member 31 is disposed on the handle to achieve a unitary design of the switch member 31 and the handle, which is pleasant in appearance and easy to operate. As such, the first storage box and/or second storage box may be opened by operating the first door body only. The switch member 31 is disposed in the recess, that is, the switch member 31 may also be operated in the operation space. The locking assembly 30 further comprises an elastic element. The switch element 31 is operable to drive the locking member 32 to move to disengage the first door body 11 from the second door body 21. The elastic element presses the locking member 32 to engage the first door body 11 with the second door body 21 to achieve automatic return of the locking member 32. The locking member 32 may also drive the switch member 31 to return. Certainly, the switch member 31 may also be connected with a return spring, which makes the structure more reliable.

The switch member 31 is pivotally connected to the middle of the first edge 112, and a pivot axis of the switch member 31 is parallel to the longitudinal direction of the first edge 112. In this way, when the user operates, the operation may be a finger-depression action and be similar to the operation of extending into the operation space to pull the first door body 11, and provides a good operation experience. Certainly, the switch member 31 may also be set to be movably connected with the first door body 11, for example, front-rear movement or up-down movement may also brings the locking member to move. The locking member may also be set to be driven by the switch member to move or rotate. The locking member 32 comprises a lock hook 323, the second door body 21 is provided with a catching slot 213, the lock hook 323 extends into the catching slot 213 to lock the first door body 11 and the second door body 21, and the lock hook 323 disengages from the catching slot 213 to separate the first door body 11 from the second door body 21. In the present embodiment, the locking member 32 is driven by the switch member 31 to rotate, and a rotation axis of the locking member 32 is disposed substantially in a vertical direction, i.e., perpendicular to the rotation axis of the switch member 31. The locking member 32 has a slope portion 325 cooperating with the switch member 31, and the switch member 31 comprises a cooperation surface 315, wherein the switch member 31 is provided with an open slot 313, the locking member 32 extends out of the open slot 313, the cooperation surface 315 is formed by an inner wall of the open slot 313, the switch member 31 pivots to make the cooperation surface 315 press the slope portion 325 to drive the locking member 32 to move against the elastic force to release the switch member 31 so that the locking member 32 may return under the action of the elastic element.

Furthermore, the first door body 11 is provided with a mounting recess 113, the locking assembly 30 further comprises a mounting seat 35 fixed in the mounting recess 113, two locking members 32 may be disposed and pivotally connected to the mounting seat 35 at an interval, the locking members 32 each may be provided with a mounting groove 326, and one end of the elastic element is fixed in the mounting groove 326 and the other end of the elastic element is fixed on the mounting seat 35. Furthermore, the switch member 31 may also be pivotally connected to the mounting seat 35, thereby facilitating the locking assembly 30, after being assembled, to connect with the first door body 11.

Further referring to FIG. 5 through FIG. 8, the second storage box 20 comprise a second chamber 202 and a covering portion 203 extending horizontally from an upper edge of the second chamber 202. The first storage box 10 is located below the covering portion 203 and an opening of the first storage box 10 is at least partially covered by the covering portion 203. The edge of the covering portion 203 extends upward to form an air hole portion 204. The air hole portion 204 is provided with a plurality of air holes 205. The first storage box 10 comprises a first chamber 102. The first chamber 102 and the second chamber 202 are in air communication through the plurality of air holes 205. In this way, the cold air flow between the two storage boxes is not affected, and the two storage boxes can be sufficiently partitioned; at the same time, the structure is compact and the storage space in the refrigerator may be sufficiently utilized. The second door body 21 is configured as a frame body comprising a door body hollow portion 210, the first door body 11 covers the door body hollow portion 210, a seal is disposed between the second door body 21 and the first door body 11, the seal is disposed around the door body hollow portion 210, and a portion of the first storage box 10 extends into the door body hollow portion 210. As such, the storage capacity of the first storage box 10 may be increased, and the connection of the first door body 11 and the first storage box 10 may be facilitated, so that the utilization rate of the space in the refrigerator may be enhanced and the manufacture be facilitated.

Furthermore, the refrigerator drawer further comprises a lifting mechanism 40 disposed between the first storage box 10 and the second storage box 20, an assisting mechanism 50 is disposed between the lifting mechanism 40 and the second storage box 20, the first door body 11 moves relative to the second door body 21, and the assisting mechanism 40 drives the lifting mechanism 40 to bring the first storage box 10 to rise up relative to the second storage box 20. In this way, the frequently-used zone in the front may be lifted up after being drawn out, thereby reducing the number of times that the user bends/squats, and improving the user's experience. Moreover, when the frequently-used zone in the front is being drawn out, the assisting mechanism 40 assists, thereby assisting the user's experience.

Specifically, the lifting mechanism 40 comprises a first link 41 and a second link 42. Both ends of the first link 41 are pivotally connected to the first door body 11 and the second door body 21, respectively. Both ends of the second link 42 are pivotally connected to the first door body 11 and the second door body 21, respectively. The second link 42 is configured as a bent link. A driving point of the assisting mechanism is located between one of the both ends of the second link and a bent portion. A bending angle $\alpha$ of the second link 42 may be set according to the size of the refrigerator drawer, the height by which the refrigerator drawer is lifted, etc. Preferably, the bending angle $\alpha$ of the second link 42 is within a range between 60 degrees and 90 degrees. In the present embodiment, the bending angle $\alpha$ of the second link 42 is 80 degrees. Since the first door body 11 is fixedly connected to the first storage box 10, and the second door body 21 is fixedly connected to the second storage box 20, it may be believed that both ends of the first link 41 are connected between the two storage boxes or connected between one door body and the other storage box, or be believed that one end of the first link is pivotally connected to the first door body, and the other end of the first link is pivotally connected to the second door body. That is to say, the first door body 11 and the first storage box 10 constitute a first storage assembly, the second door body 21 and the second storage box 20 constitute a second storage assembly, both ends of the first link 41 are pivotally connected to the first storage assembly and the second storage assembly, respectively, both ends of the second link 42 are pivotally connected to the first storage assembly and the second storage assembly, respectively, and pivoting points on the same assembly are spaced apart.

Furthermore, a connecting sheet 16 is connected between the first door body 11 and the lifting mechanism 40, the connecting sheet 16 is configured in an L shape, one end of the connecting sheet 16 is fixedly connected to the first door body 11, and the other end of the connecting sheet 16 is provided with two pivotal connection points at which the connecting sheet 16 is respectively connected to one end of the first link 41 and one end of the second link 42, wherein a horizontal position of the pivoting point of the first link 41 and the connecting sheet 16 is higher than a horizontal position of the pivoting point of the second link 42 and the connecting sheet 16. A bracket is connected between the second door body 21 and the lifting mechanism 40. The bracket comprises a horizontal bracket 25 and a vertical bracket 26. The horizontal bracket 25 is fixed between the second door body 21 and the box body of the second storage box 20. The horizontal bracket 25 may also be configured as an L-shaped bracket, with a long side being fixedly connected to a side edge of the second storage box 20 in a moving direction of the second storage box 20, and a short side being fixed to the second door body 21. The vertical bracket 26 extends in a direction perpendicular to the long side, one end of the vertical bracket 26 is fixedly connected to the vertical bracket 25, and the other end of the vertical bracket 26 is connected to the assisting mechanism 50. The first door body 11 may be fixedly connected to or detachably connected to the first storage box 10 via other structures. In the present embodiment, the first door body 11 is provided with two raised ribs 117 distributed at an interval, a distance between the two raised ribs 117 matches a width of the box body of the first storage box, the two raised ribs 117 are each provided with a projection on the inner side, a recess 107 is correspondingly provided on both sides of the first storage box 10, an area of the recess 107 matches an area of the raised rib 117, an n-shaped groove 108 is provided in the recess 107, and the first storage box 10 and the first door body 11 may be mounted by allowing the two raised ribs 117 to be snap-fitted in the two recesses 107 in the vertical direction and allowing the projection 118 to sink into the groove 108.

The assisting mechanism 50 is configured as an air spring of which one end is pivotally connected to a bottom of the vertical bracket 26 and of which the other end is pivotally connected to the second link 42. With the air spring being set for assistance, it is very force-saving to open the first storage box 10, the structure is simple and the mounting is relatively convenient, thereby reducing the manufacturing cost of the refrigerator drawer. Certainly, the assisting mechanism may also be a hydraulic rod assembly, which can also achieve the assisting function.

In other implementable modes, the lifting mechanism 40 may also be used for a refrigerator drawer with a single storage box. In this case, the refrigerator drawer may comprise a bracket, the first storage box 10 and the first door body 11, wherein the first storage box 10 is disposed movably relative to the bracket, and the first door body 11 is fixedly connected to one side of the first storage box 10 to open the first storage box 10. The lifting mechanism 40 may be disposed between the first storage box 10 and the bracket, the assisting mechanism 50 is disposed between the lifting mechanism 40 and the bracket, the first door body 11 drives the first storage box 10 to move relative to the bracket, the assisting mechanism 50 drives the lifting mechanism 40 to bring the first storage box 10 to rise up relative to the bracket, the lifting mechanism 40 comprises the first link 41 and the second link 42, both ends of the first link 41 are pivotally connected to the first door body 10 and the bracket, respectively, both ends of the second link 42 are pivotally connected to the first door body 11 and the bracket, respectively, the second link is configured as a bent link, and the driving point of the assisting mechanism is located between one of both ends of the second link and the bent portion.

In other words, the second storage box 20 may be regarded as part of the cabinet of the refrigerator. As such, it may be believed that the bracket is fixedly connected in the cabinet of the refrigerator, thereby achieving the rise when the single storage box is drawn out. In this way, the drawer at the bottom may be lifted after being drawn out, which may also reduce the times that the user bends/squats, and improve the user's experience. Furthermore, with the assisting mechanism being set for assistance, the user saves force upon drawing the drawer and has a better experience.

Furthermore, the second link 42 is provided with at least two mounting holes 421, and the other end of the air spring is optionally pivotally connected to one of the at least two mounting holes 421. With a plurality of mounting holes 421 being provided, on the one hand, the force of the air spring may be adjusted, for example, the same air spring will be tight when connected to a lower mounting hole, and loose when connected to an upper mounting hole, and the tightness of the air spring is the magnitude of the elastic force; on the other hand, the height by which the first storage box 10 is lifted may be adjusted by connecting the air spring to different mounting holes. That is to say, as for the air spring with the same elastic force, if the length of the air spring is different, the height by which the first storage box is lifted when the first storage box is drawn out may be changed by changing the positions of the mounting holes to which the air spring is connected; as for the air spring with the same length, the magnitude of the force for drawing out the first storage box may be changed by changing the positions of the mounting holes to which the air spring is connected. Certainly, a plurality of mounting holes may also be provided on the vertical bracket 26, and one end of the air spring is optionally pivotally connected to one of the plurality of mounting holes 421 to achieve the same function.

Figure 9:
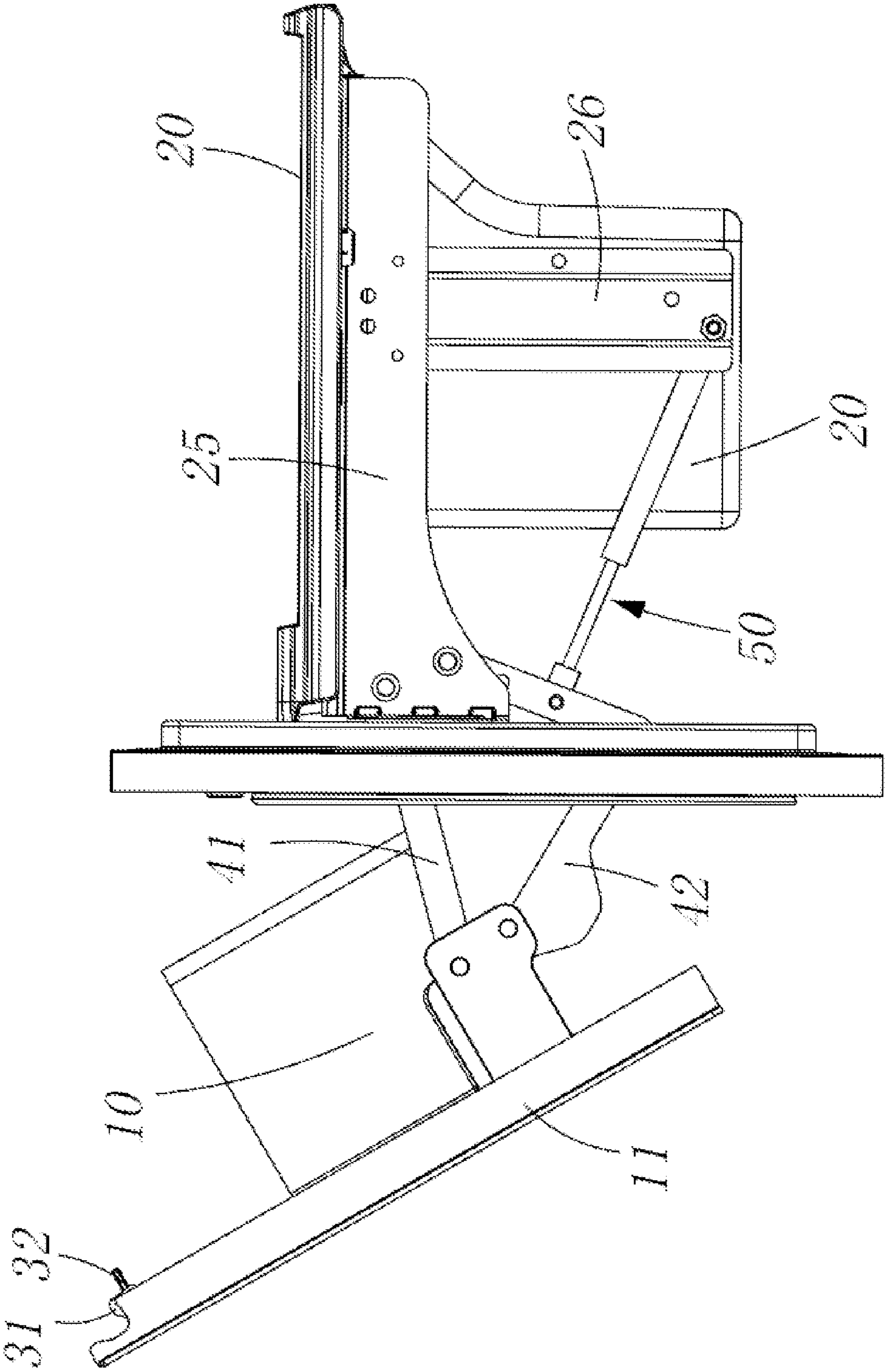
FIG. 9 is a perspective view of the refrigerator drawer of FIG. 1 with a first storage box being in an open state.

In addition, to achieve synchronization of left and right sides when the first storage box 10 is drawn out, the first link 41 and the second link 42 are respectively disposed on both sides of the first storage box 10, a synchronization rod 45 is connected between the second links 42 on both sides, and the synchronization rod 45 is located at the bottom of the first storage box 10 so that the first storage box will not tilt leftwards or rightwards no matter how the first storage box 10 is drawn out. As shown in FIG. 9, the driving point of the assisting mechanism is located between one end of the second link 42 connected to the horizontal bracket 25 and the bent portion; during the drawing of the first storage box 10, the elastic force exerted by the air spring on the second link 42 changes in direction, and comprises a force component for driving the first storage box 10 forward and a force component for driving the first storage box 10 upwards, thereby opening the first storage box 10 to the position shown in FIG. 9. Therefore, no matter whether the first storage box 10 is drawn outwards or lifted upwards, the air spring assists so that the user's act of opening the drawing is more force-saving.

Another embodiment of the present invention provides a refrigerator, comprising: a cabinet and the aforesaid refrigerator drawer disposed movably on the cabinet, wherein the refrigerator drawer is disposed at a bottom of the cabinet.

According to the above embodiments, in the present invention, a partitioned design in the front-rear direction is achieved in the freezing drawer zone, different zones are opened respectively according to needs, and the appearance is novel. The frequently-used zone in the front and a conventional handle structure are designed in an integrated manner, thereby providing a pleasant appearance and facilitating the operation. The front zone may store food materials with a short storage duration, and the rear zone may store food materials with a long storage duration, thereby reducing the mass load when the user draws the drawer and improving the user's experience. In addition, the inside storage box storing the food materials with a long storage duration may still be drawn out as a whole in a conventional manner. As such, storing the food materials with the long storage duration inside provides a small temperature change to ensure a freezing effect, does not change the user's traditional refrigerator-using habit and provides convenience and utility. Furthermore, the frequently-used zone in the front may be lifted after being drawn out, which may also reduce the times that the user bends/squats, and improve the user's experience. When the frequently-used zone in the front is drawn out, the air spring is disposed below to assist to further improve the user's experience.

It should be understood that although the description is described according to the embodiments, not every embodiment only includes one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A refrigerator drawer, wherein the refrigerator drawer comprises:

a bracket;

a first storage box disposed movably relative to the bracket;

a second storage box arranged independent from and side by side with the first storage box;

a first door body fixedly connected to one side of the first storage box to open the first storage box;

a second door body fixedly connected to the second storage box, both the first door body and the second door body being disposed on the same side of the first storage box, and the first door body and the second door body being engaged to open the second storage box;

a lifting mechanism disposed between the first storage box and the bracket or between the first door body and the bracket, an assisting mechanism being disposed between the lifting mechanism and the bracket, the first door body driving the first storage box to move relative to the bracket, the assisting mechanism driving the lifting mechanism to bring the first storage box to rise up relative to the bracket;

wherein the lifting mechanism comprises a first link and a second link, both ends of the first link are pivotally connected to the first door body and the bracket, respectively, both ends of the second link are pivotally connected to the first door body and the bracket, respectively, the second link is configured as a bent link, and a driving point of the assisting mechanism is located between one of the both ends of the second link and a bent portion of the second link;

wherein the assisting mechanism is configured as an air spring, the bracket comprises a horizontal bracket and a vertical bracket, the vertical bracket is fixed on the horizontal bracket, one end of the air spring is pivotally connected to a bottom of the vertical bracket, and the other end of the air spring is pivotally connected to the second link.

2. The refrigerator drawer according to claim 1, wherein the second link is provided with at least two mounting holes, and the other end of the air spring is optionally pivotally connected to one of the at least two mounting holes.

3. The refrigerator drawer according to claim 1, wherein the first link and the second link are respectively disposed on both sides of the first storage box, a synchronization rod is connected between the second links on both sides, and the synchronization rod is located at the bottom of the first storage box.

4. The refrigerator drawer according to claim 1, wherein the refrigerator drawer further comprises a locking assembly disposed between the first door body and the second door body, the locking assembly comprises a switch member disposed on the first door body and a locking member controlled by the switch member, the switch member operably drives the locking member to move to engage the first door body with the second door body or disengage the first door body from the second door body.

5. The refrigerator drawer according to claim 2, wherein the first door body has a first edge lower than the second door body, a recess is formed on a side of the first edge facing the second door body, the recess extends in a longitudinal direction of the first edge to form an operation space for operating the first door body, the switch member is disposed in the recess, the locking assembly further comprises an elastic element, the switch element is operable to drive the locking member to move to disengage the first door body from the second door body, and the elastic element presses the locking member to engage the first door body with the second door body.

6. The refrigerator drawer according to claim 3, wherein the switch member is pivotally connected to the middle of the first edge, a pivot axis of the switch member is parallel to the longitudinal direction of the first edge, the locking member has a slope portion cooperating with the switch member, the switch member comprises a cooperation surface, and the switch member pivots to make the cooperation surface press the slope portion to drive the locking member to move against an elastic force.

7. The refrigerator drawer according to claim 1, wherein the second storage box comprise a second chamber and a covering portion extending horizontally from an upper edge of the second chamber, the first storage box is located below the covering portion and an opening of the first storage box is at least partially covered by the covering portion, an edge of the covering portion extends upward to form an air hole portion, the air hole portion is provided with a plurality of air holes, the first storage box comprises a first chamber, and the first chamber and the second chamber are in air communication through the plurality of air holes.

8. The refrigerator drawer according to claim 1, wherein the second door body is configured as a frame body comprising a door body hollow portion, the first door body covers the door body hollow portion, a seal is disposed between the first door body and the second door body, the seal is disposed around the door body hollow portion, and a portion of the first storage box extends into the door body hollow portion.

9. A refrigerator, wherein the refrigerator comprises: a cabinet and the refrigerator drawer disposed on the cabinet according to claim 1, the refrigerator drawer being disposed at a bottom of the cabinet.

10. A refrigerator drawer, wherein the refrigerator drawer comprises:

a bracket;

a first storage box disposed movably relative to the bracket;

a second storage box arranged independent from and side by side with the first storage box;

a first door body fixedly connected to one side of the first storage box to open the first storage box;

a second door body fixedly connected to the second storage box, both the first door body and the second door body being disposed on the same side of the first storage box, and the first door body and the second door body being engaged to open the second storage box;

a lifting mechanism disposed between the first storage box and the bracket or between the first door body and the bracket, an assisting mechanism being disposed between the lifting mechanism and the bracket, the first door body driving the first storage box to move relative to the bracket, the assisting mechanism driving the lifting mechanism to bring the first storage box to rise up relative to the bracket;

wherein the lifting mechanism comprises a first link and a second link, both ends of the first link are pivotally connected to the first door body and the bracket, respectively, both ends of the second link are pivotally connected to the first door body and the bracket, respectively, the second link is configured as a bent link, and a driving point of the assisting mechanism is located between one of the both ends of the second link and a bent portion of the second link;

wherein the first link and the second link are respectively disposed on both sides of the first storage box, a synchronization rod is connected between the second links on both sides, and the synchronization rod is located at the bottom of the first storage box.

* * * * *